(12) United States Patent
Kim et al.

(10) Patent No.: US 10,025,916 B2
(45) Date of Patent: Jul. 17, 2018

(54) METHOD AND APPARATUS FOR EXECUTING DEVICE ACCORDING TO USAGE AUTHORITY

(71) Applicant: Samsung Electronics Co., Ltd., Suwon-si, Gyeonggi-do (KR)

(72) Inventors: Jongseok Kim, Hwaseong-si (KR); Kihong Min, Seoul (KR); Chisung Bae, Yongin-si (KR); Daekwang Jung, Suwon-si (KR); Seokwhan Chung, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 140 days.

(21) Appl. No.: 15/072,988

(22) Filed: Mar. 17, 2016

(65) Prior Publication Data

US 2016/0283704 A1 Sep. 29, 2016

Related U.S. Application Data

(60) Provisional application No. 62/139,063, filed on Mar. 27, 2015.

(30) Foreign Application Priority Data

Jul. 7, 2015 (KR) ........................ 10-2015-0096789

(51) Int. Cl.
*G06F 17/00* (2006.01)
*G06F 21/32* (2013.01)
*H04L 29/08* (2006.01)
*H04W 4/00* (2018.01)
*H04W 12/08* (2009.01)
*H04W 4/80* (2018.01)
(Continued)

(52) U.S. Cl.
CPC .............. *G06F 21/32* (2013.01); *G06F 21/36* (2013.01); *G06F 21/6218* (2013.01); *G07C 9/00* (2013.01); *H04L 67/12* (2013.01); *H04W 4/008* (2013.01); *H04W 4/80* (2018.02); *H04W 12/08* (2013.01); *G06F 2221/2149* (2013.01)

(58) Field of Classification Search
CPC ........ G06F 2/32; G06F 21/36; G06F 21/6218; G07C 9/00; H04L 67/12; H04W 4/008; H04W 12/08
See application file for complete search history.

(56) References Cited

U.S. PATENT DOCUMENTS 6,507,762 B1 1/2003 Amro et al.
8,595,800 B1 11/2013 Robinson et al.
(Continued)

FOREIGN PATENT DOCUMENTS

JP 2008210397 A 9/2008
KR 20140106792 A 9/2014
KR 20150009847 A 1/2015

*Primary Examiner* — Techane Gergiso
(74) *Attorney, Agent, or Firm* — Harness, Dickey & Pierce, P.L.C.

(57) ABSTRACT

Provided are a method and apparatus for executing a device according to usage authority, wherein usage authority information for a first device may be received, usage authority for the first device may be identified based on the received usage authority information as well as telephone number information of a user, and the first device may be executed according to the identified usage authority for the first device.

13 Claims, 10 Drawing Sheets

(51) Int. Cl.
  *G06F 21/36*  (2013.01)
  *G06F 21/62*  (2013.01)
  *G07C 9/00*  (2006.01)

(56) References Cited

U.S. PATENT DOCUMENTS

| | | | |
|---|---|---|---|
| 8,621,583 | B2 | 12/2013 | Yang et al. |
| 9,584,482 | B2 * | 2/2017 | Burns ............... H04L 12/66 |
| 9,633,197 | B2 * | 4/2017 | Lakshmanan ........ G06F 21/44 |
| 9,712,491 | B2 * | 7/2017 | Burns ............... H04L 12/66 |
| 9,769,133 | B2 * | 9/2017 | Pogorelik .......... H04L 63/062 |
| 2007/0033397 | A1 * | 2/2007 | Phillips, II ........ H04L 63/045 |
| | | | 713/168 |
| 2007/0250885 | A1 | 10/2007 | Ohashi |
| 2011/0283338 | A1 | 11/2011 | Yang et al. |
| 2012/0295580 | A1 * | 11/2012 | Corner ............... H04W 12/12 |
| | | | 455/405 |
| 2013/0047229 | A1 | 2/2013 | Hoefel et al. |
| 2013/0061055 | A1 * | 3/2013 | Schibuk ............. G06Q 20/223 |
| | | | 713/172 |
| 2013/0198836 | A1 | 8/2013 | Wuellner et al. |
| 2014/0189808 | A1 * | 7/2014 | Mahaffey ........... H04L 63/083 |
| | | | 726/4 |
| 2014/0221032 | A1 | 8/2014 | Yang |
| 2014/0338006 | A1 * | 11/2014 | Grkov ............... H04L 63/14 |
| | | | 726/35 |
| 2014/0373100 | A1 | 12/2014 | Poiesz |
| 2015/0006695 | A1 * | 1/2015 | Gupta .............. H04L 41/32 |
| | | | 709/223 |
| 2015/0007273 | A1 * | 1/2015 | Lin ................. H04L 63/08 |
| | | | 726/4 |
| 2015/0095999 | A1 * | 4/2015 | Toth ................ H04L 63/08 |
| | | | 726/6 |
| 2015/0121470 | A1 * | 4/2015 | Rongo ............... H04L 63/10 |
| | | | 726/4 |
| 2015/0121506 | A1 * | 4/2015 | Cavanaugh .......... G06F 21/62 |
| | | | 726/16 |
| 2015/0201022 | A1 * | 7/2015 | Kim ................ H04W 4/005 |
| | | | 709/203 |
| 2015/0237071 | A1 * | 8/2015 | Maher .............. H04L 63/20 |
| | | | 726/1 |
| 2015/0249672 | A1 * | 9/2015 | Burns .............. H04L 12/66 |
| | | | 726/4 |
| 2015/0278810 | A1 * | 10/2015 | Ramatchandirane .. G06Q 20/30 |
| | | | 705/16 |
| 2015/0347734 | A1 * | 12/2015 | Beigi ............... G06F 21/32 |
| | | | 713/155 |
| 2016/0072839 | A1 * | 3/2016 | Mortimore, Jr. ..... H04L 63/20 |
| | | | 726/1 |
| 2016/0205097 | A1 * | 7/2016 | Yacoub ............. H04L 63/0876 |
| | | | 726/6 |
| 2016/0259932 | A1 * | 9/2016 | Lakshmanan ........ G06F 21/44 |
| 2017/0237815 | A1 * | 8/2017 | Arsenault .......... H04L 67/12 |
| | | | 709/217 |

* cited by examiner

LEVEL 1 AREA

AUTHORITY FOR OFFICE ENTRANCE

LEVEL 2 AREA

AUTHORITY FOR
LOCKER/WAREHOUSE ENTRANCE

METHOD AND APPARATUS FOR EXECUTING DEVICE ACCORDING TO USAGE AUTHORITY

CROSS-REFERENCE TO RELATED APPLICATIONS

This application claims the benefit of U.S. Provisional Application No. 62/139,063, filed on Mar. 27, 2015, in the US Patent Office and Korean Patent Application No. 10-2015-0096789, filed on Jul. 7, 2015, in the Korean Intellectual Property Office, the disclosures of which are incorporated herein in their entireties by reference.

BACKGROUND

1. Field

The present disclosure relates to a method and apparatus for executing a device according to usage authority.

2. Description of the Related Art

Intelligence-based technology and services (for example, internet of things (IOT)), are increasing in which information is exchanged each other between men and things, and between things and things through connecting things with the internet as a base. Contrary to performing one independent function at a time, the IOT devices may have a basic capability of collecting and transmitting information and being connected through a network, and thus, can exchange information between each other. Such characteristics of not being constrained by time and space can be used in various areas.

SUMMARY

Provided are a method and apparatus for executing a device according to usage authority. Also, provided is a non-transitory computer-readable recording medium having recorded thereon computer-readable code for performing the method on a computer.

Additional aspects will be set forth in part in the description which follows and, in part, will be apparent from the description, or may be learned by practice of the presented example embodiments.

According to an aspect of at least one example embodiment, a method of executing a device according to usage authority may include receiving usage authority information for a first device, identifying the usage authority for the first device based on the received usage authority information as well as telephone number information of a user, and executing the first device according to the identified usage authority for the first device.

In addition, the identifying may include identifying whether the user is authentic by using biometric information of the user.

In addition, biometrics of the user may include information about fingerprints, an iris, a voice or veins of the user.

In addition, the receiving may receive the usage authority information for the first device, which may differ depending on the user.

In addition, the receiving may receive information transmitted by a second device storing the usage authority information for the first device depending on each user.

In addition, the usage authority information for the first device may include the usage authority information for executing some functions of the first device.

In addition, the usage authority information for the first device may include the usage authority information for executing functions of the first device at only a predetermined or, alternatively, desired time, from among a plurality of times.

In addition, the usage authority information for the first device may include the usage authority information for executing functions of the first device in only a predetermined or, alternatively, desired space, from among a plurality of spaces.

In addition, the first device may include devices based on an internet of things (IOT).

According to an aspect of at least another example embodiment, an apparatus for executing a device according to usage authority may include a receiver receiving usage authority information for a first device, an identification unit identifying the usage authority for the first device based on the received usage authority information as well as telephone number information of a user, and an execution unit executing the first device according to the identified usage authority for the first device.

In addition, the identification unit may identify whether the user is authentic by using the biometric information of the user.

In addition, the biometrics of the user may include information about fingerprints, an iris, a voice or veins of the user.

In addition, the receiver may receive the usage authority information for the first device, which may differ depending on the user.

In addition, the receiver may receive information transmitted by a second device storing the usage authority information for the first device depending on each user.

In addition, the usage authority information for the first device may include the usage authority information for executing some functions of the first device.

In addition, the usage authority information for the first device may include the usage authority information for executing functions of the first device at only a predetermined or, alternatively, desired time, from among a plurality of times.

In addition, the usage authority information for the first device may include the usage authority information for executing functions of the first device in only a predetermined or, alternatively, desired space, from among a plurality of spaces.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Throughout the specification, when a portion "includes" an element, another element may be further included, rather than excluding the existence of the other element, unless otherwise described. In addition, one or more elements discussed in the present disclosure, including elements referred to using the term "unit," (e.g., the apparatus 100, receiver 110, identification unit 120, execution unit 130, administration device 300, and authorized device 310) may be implemented by or embodied in, for example, a software or hardware component such as a processor, a field-programmable logic array (FPLA), field programmable gate array (PFGA), and application-specific integrated circuit (ASIC), or a combination of software and hardware including, for example, one or more processors and memory storing computer code including instructions that, when executed by the one or more processors, cause the one or more processors to perform any or all of the functions described in the present disclosure as being performed by any or all of the one or more elements. The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers. However, the "unit" is not limited to software or hardware. The "unit" may be configured to be stored in an addressable storing medium or to play back one or more processors. Accordingly, the "unit" may include, for example, software components, object-oriented software components, components such as class components and task components, processors, formulas, attributes, procedures, subroutines, segments of program codes, drivers, firmware, micro codes, circuits, data, database, data structures, tables, arrays and variables. Functions provided in components and "units" may be combined into a smaller number of components and "units", or may be further divided into additional components and "units."

Figure 1:
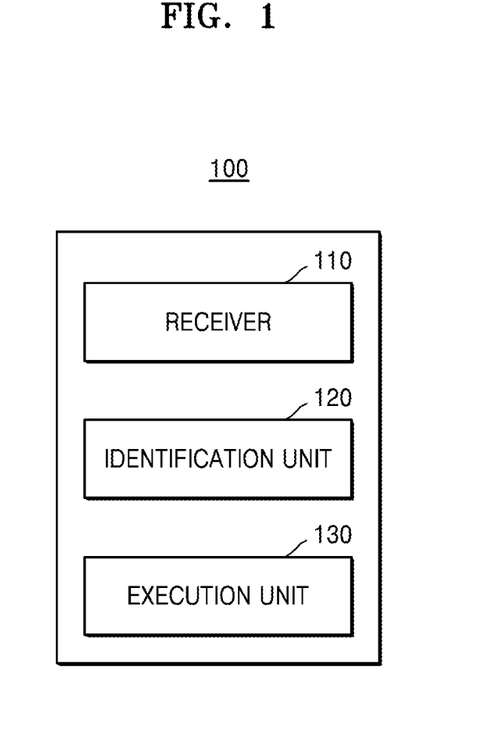
FIG. 1 is a schematic diagram of a configuration of an apparatus for executing a device according to usage authority, according to one or more example embodiments.

FIG. 1 is a schematic diagram of a configuration of an apparatus 100 for executing a device according to usage authority, according to one or more example embodiments. Referring to FIG. 1, the apparatus 100 for executing a device according to the usage authority may include a receiver 110, an identification unit 120, and an execution unit 130.

The receiver 110 may receive usage authority information for a first device. The first device may include one or more devices based on the internet of things (IOT). In addition, only when a telephone number of a user stored in the apparatus 100 is a predetermined or, alternatively, desired telephone number from among a plurality of telephone numbers, the receiver 110 may receive the usage authority information for the first device. The receiver 110 may receive the usage authority information for the first device, which may differ depending on the user. For example, the usage authority when the user is Hong Gildong may be different from that when the user is Lim Gguckjeong. In addition, the receiver 110 may receive information transmitted by a second device storing the usage authority information for the first device depending on each user. In addition, the receiver 110 may receive information transmitted by the second device storing information about the usage authority for the first device depending on each user. The second device maybe an administration device storing the usage authority information for the first device depending on each user. In addition, the receiver 110 may receive information about the usage authority transmitted by the administration device. Information about the usage authority for the first device may include information about the usage authority for executing some functions of the first device.

The identification unit 120 may identify the usage authority for the first device based on the received usage authority information as well as telephone number information of the user. For example, when the telephone number of the user is predetermined or, alternatively, determined to be 010-1234-5678, the usage authority indicating that the apparatus 100 may use the first device may be identified. In addition, the identification unit 120 may identify whether the user is authentic by using biometric information of the user. The biometrics of the user may include information about fingerprints, an iris, a voice or veins of the user. For example, when the identification unit 120 identifies the user through identifying fingerprints of the user, the apparatus 100 may permit the user to use the first device according to the usage authority received by the apparatus 100. In addition, when the identification unit 120 identifies the user through identifying the iris of the user, the apparatus 100 may permit the user to use the first device according to the usage authority received by the apparatus 100. As another example, when the identification unit 120 identifies the user through identifying the voice or a voiceprint of the user, the apparatus 100 may permit the user to use the first device according to the usage authority received by the apparatus 100. Similarly, when the identification unit 120 identifies the user through identifying the shape of vein in a predetermined or, alternatively, desired area of the user from among a plurality of areas, the apparatus 100 may permit the user to use the first device according to the usage authority received by the apparatus 100.

The execution unit 130 may execute (e.g., control) the first device according to the identified usage authority for the first device. The usage authority information for the first device may include the usage authority information for executing the first device at Thus, the execution unit 130 may execute functions of the first device at only a predetermined or, alternatively, desired time, from among a plurality of times. For example, the execution unit 130 may execute functions of the first device from about 10:00 to about 12:00 only, according to usage authority information permitting an execution of functions of the first device at a predetermined or, alternatively, desired time from among a plurality of times. The predetermined or, alternatively, desired time may be, for example, from about 10:00 to about 12:00 only.

In addition, the usage authority information for the first device may include the usage authority information permitting an execution of functions of the first device in only a predetermined or, alternatively, desired space, from among a plurality of spaces. Thus, the execution unit 130 may execute functions of the first device in only a predetermined or, alternatively, desired space, from among a plurality of spaces. For example, the usage authority information for the first device may include the usage authority information permitting an execution of functions of the first device in a conference room while blocking an execution of functions of the first device at a lobby. According to such an example, the execution unit 130 may execute functions of the first device in a conference room but may not execute functions of the first device at a lobby according to the usage authority information.

Figure 2:
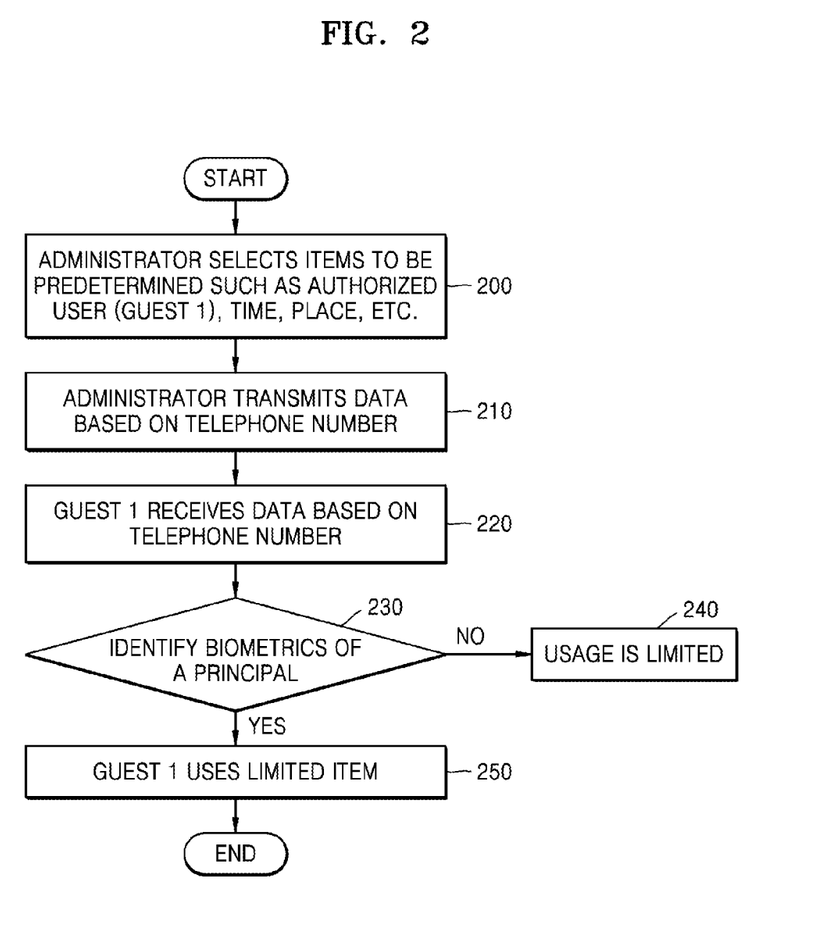
FIG. 2 is a flowchart of a method of executing the device according to the usage authority.

FIG. 2 is a flowchart of a method of executing the device according to the usage authority.

The administration device may select items to be predetermined or, alternatively, determined such as an authorized user (guest 1) device, time, place, etc. S200.

The administration device may transmit data based on a telephone number S210.

The authorized user device may receive data based on the telephone number transmitted by the administration device S220.

The authorized user device may determine whether the user corresponds to the usage authority (for example, a principal) through biometrics S230.

When the result of the biometrics S230 shows that the user does not correspond to the usage authority, usage of the first device may be limited S240.

When the result of the biometric identification S230 shows that the user corresponds to the usage authority, the usage of functions of the first device may be permitted according to the usage authority S250. In addition, when the usage authority is predetermined or, alternatively, determined as a limited usage of functions of the first device, usage of functions of the first device may be restrictively permitted.

FIGS. 3 through 8 are illustrative examples of a method of executing a device according to usage authority, according to one or more example embodiments.

Figure 3:
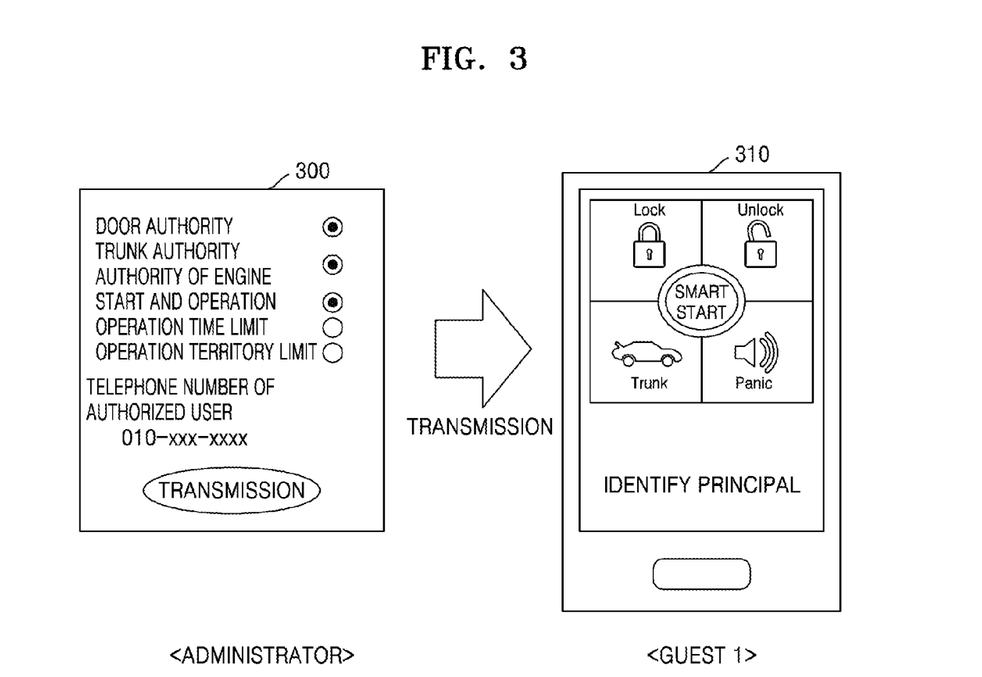
FIGS. 3 through 8 are illustrative examples of a method of executing a device according to usage authority, according to one or more example embodiments.

FIG. 3 is an illustrative example of authorization of a limited authority for usage of an automobile.

The second device described in FIG. 1 may include an administration device 300. An authorized apparatus 310 in relation to usage of the automobile may receive the usage authority transmitted by the administration device 300. The usage authority may include door authority for opening doors of the automobile, a trunk authority for opening the trunk of the automobile, and a start and operation authority for starting and operating the automobile. However, the usage authority may not include an authority for an operation time limit and an authority for an operation territory limit. The authorized apparatus 310 may receive the usage authority information for the automobile transmitted by the administration device 300, in relation to the usage of the automobile. The administration device 300 may transmit the usage authority information to the authorized apparatus 310 receiving an authority corresponding to a telephone number of an authorized person. The authorized apparatus 310 may open doors of the automobile according to the transmitted usage authority information. The authorized apparatus 310 may open the trunk of the automobile according to the transmitted usage authority information. In addition, the authorized apparatus 310 may start an engine of the automobile and operate the automobile according to the transmitted usage authority information.

Figure 4:
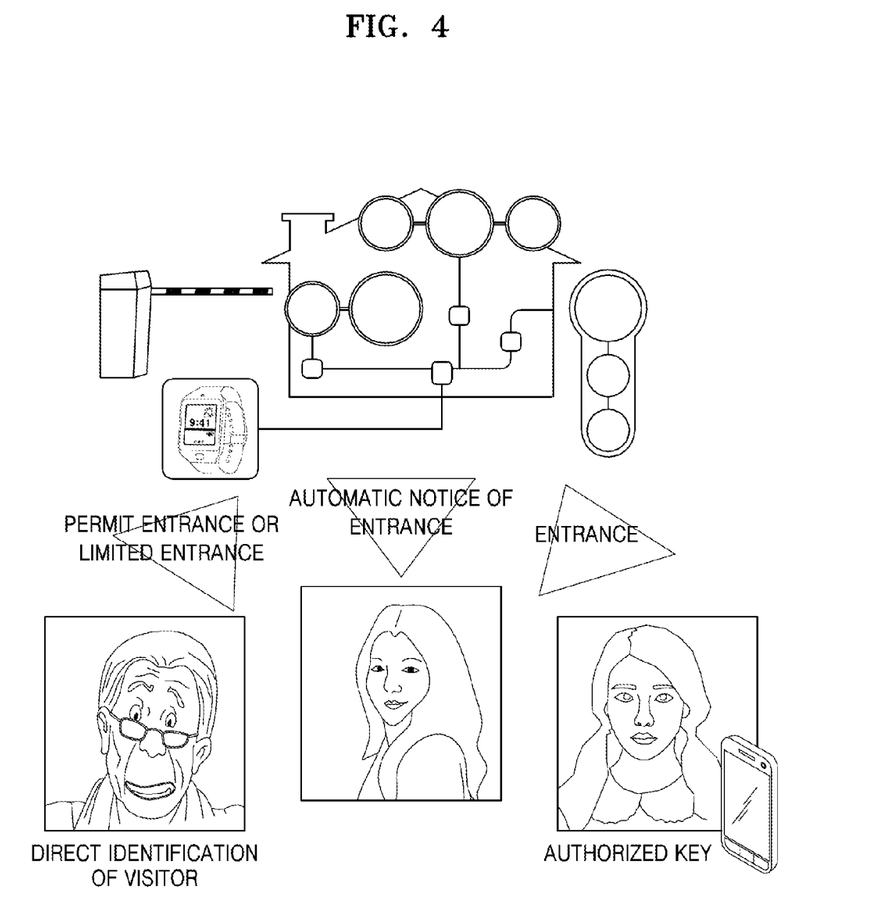

FIG. 4 is an illustrative example of authorization of a limited authority in relation to a house visitor.

Referring to FIG. 4, an apparatus 100 may permit an entrance or a limited entrance of a visitor. For example, the apparatus 100 may receive the usage authority information for doors of a house transmitted by the administration device. The apparatus 100 may identify the usage authority and then, permit the entrance through the doors according to a limited usage authority.

Figure 5:
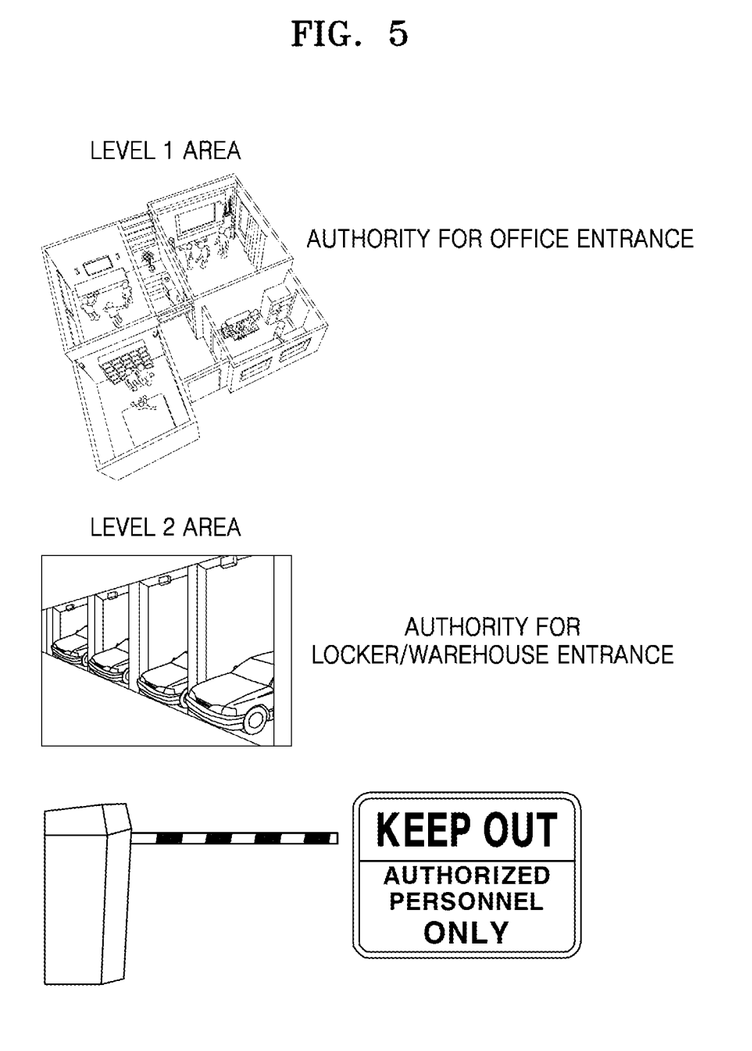

FIG. 5 is an illustrative example of authorization of a limited authority in relation to an office user and a visitor. Referring to FIG. 5, an apparatus 100 may permit an entrance to the office, but may limit the usage of a locker and a warehouse. For example, the apparatus 100 may receive the usage authority information transmitted by the administration device for the usage of the office, the locker and the warehouse. The apparatus 100 may identify the usage authority and then, may use the entrance to the office according to the usage authority. However, after the apparatus 100 identifies the usage authority, an entrance to the private locker and the warehouse may not be permitted according to the usage authority.

Figure 6:
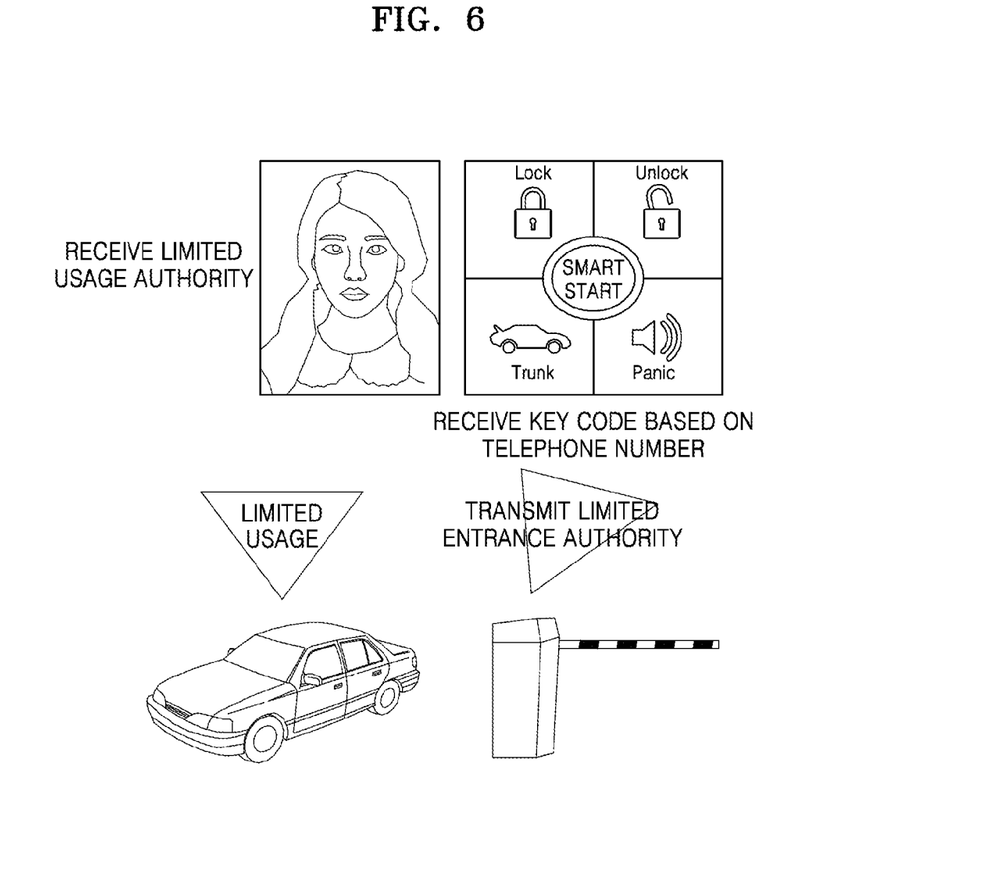

FIG. 6 is an illustrative example of authorization of a limited authority in relation to an entrance of an automobile.

Referring to FIG. 6, an apparatus 100 may receive information about an entrance authority in relation to an entrance of an automobile, along with a key code based on a telephone number. Accordingly, the apparatus 100 may identify information, stored in the apparatus 100, about a corresponding automobile and the automobile, and may use an entrance gate for an automobile to pass.

Figure 7:
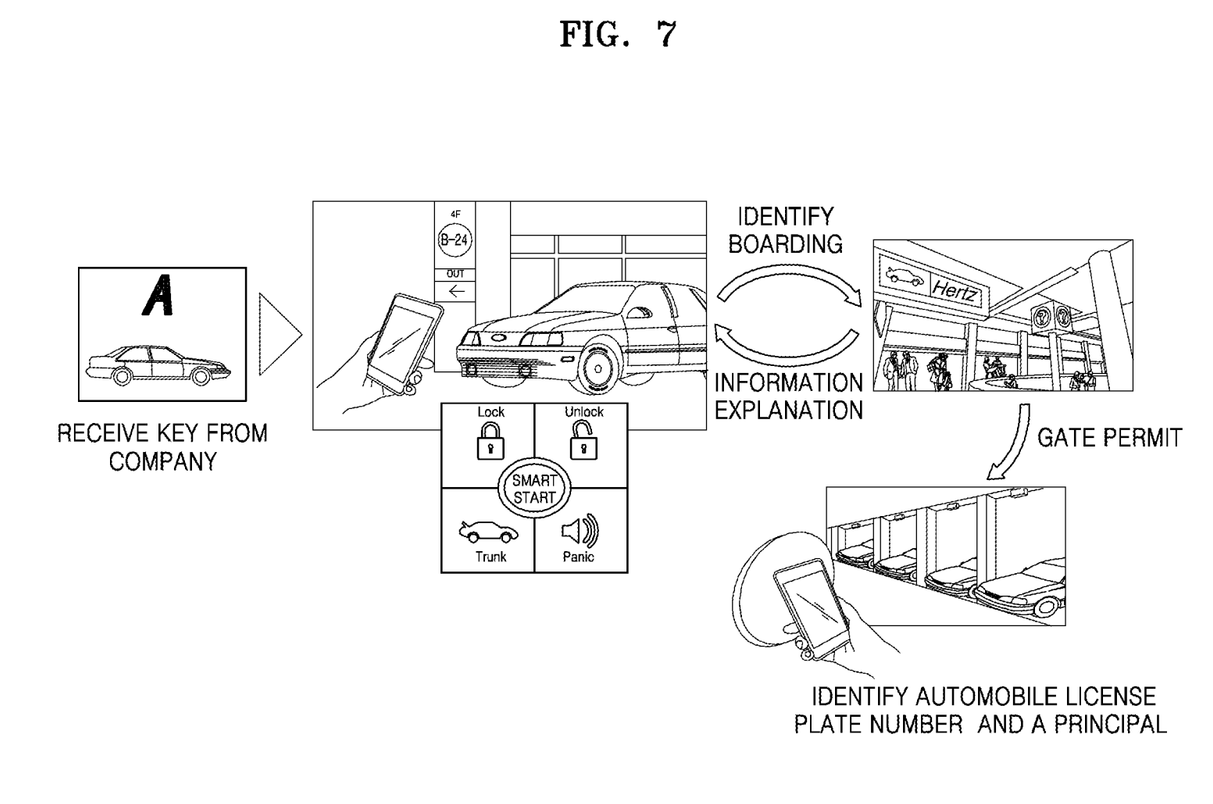

FIG. 7 is an illustrative example of an authorization for using an automobile.

Referring to FIG. 7, an apparatus 100 of a user may receive a key code along with information about the usage authority for a gate, transmitted by a company having an administration device. The apparatus 100 may identify the usage authority information for the gate, automobile number information and the user. The apparatus 100 may allow entry through the gate (e.g., by causing the gate to open) according to the usage authority after the usage authority is identified.

Figure 8:
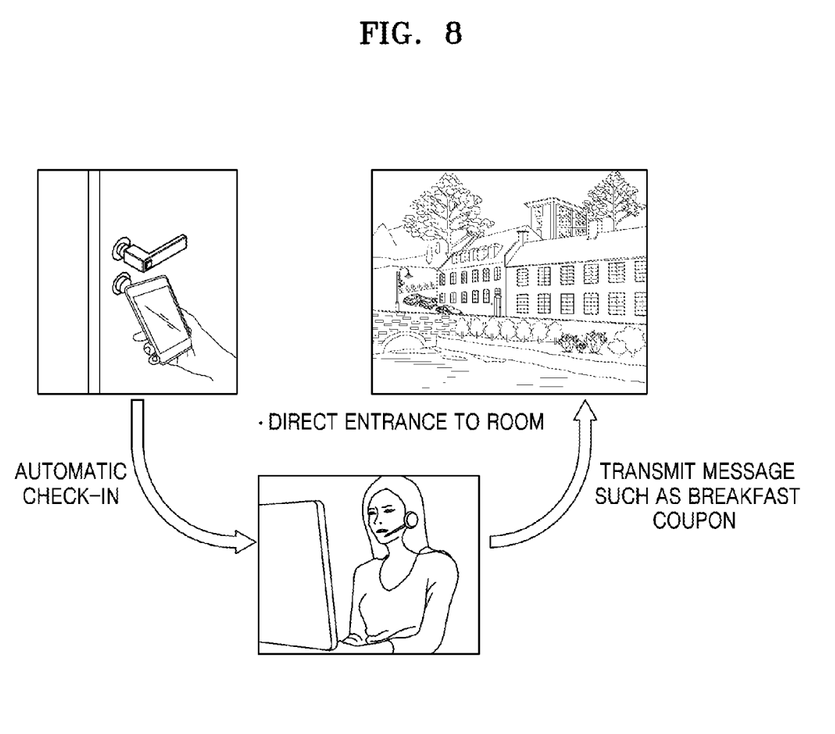

FIG. 8 is an illustrative example of authorizing a limited authority in relation to accommodation.

The apparatus 100 may receive room usage authority information transmitted by a hotel administration device. The apparatus 100 may identify the received room usage authority information and user information of the apparatus 100. The apparatus 100 may permit the user to enter the room according to the room usage authority information. In addition, the apparatus 100 may receive a breakfast coupon transmitted by the hotel administration device. In addition, the apparatus 100 may permit an automatic check-in according to the room usage authority information.

Figure 9:
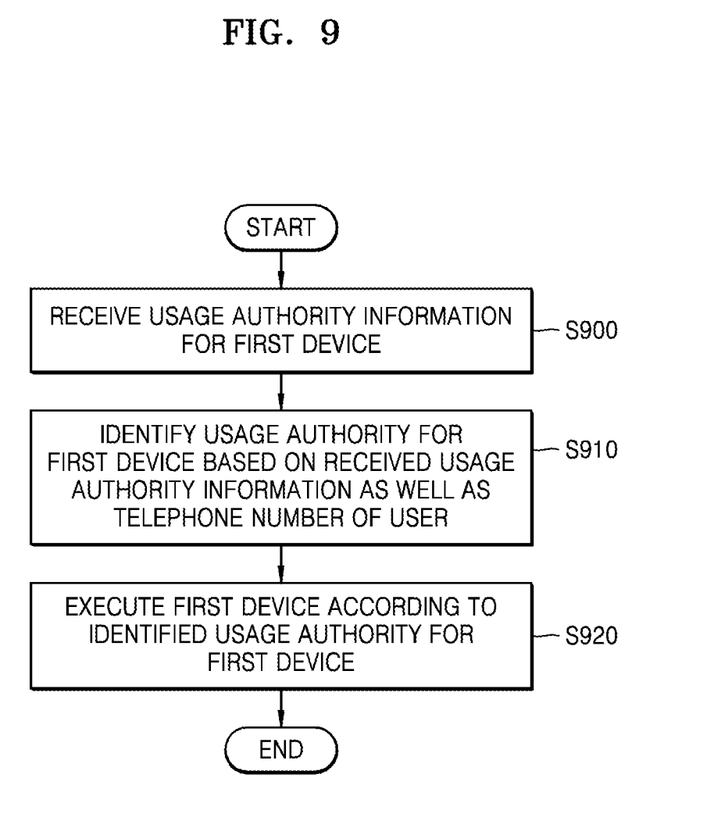
FIG. 9 is a flowchart of a method of executing a device according to usage authority, according to one or more example embodiments.

FIG. 9 is a flowchart of a method of executing a device according to usage authority, according to one or more example embodiments.

Usage authority information for a first device may be received S900.

The usage authority for the first device may be identified based on the received usage authority information and telephone number information of a user S910.

The first device may be executed according to the identified usage authority for the first device S920.

Figure 10:
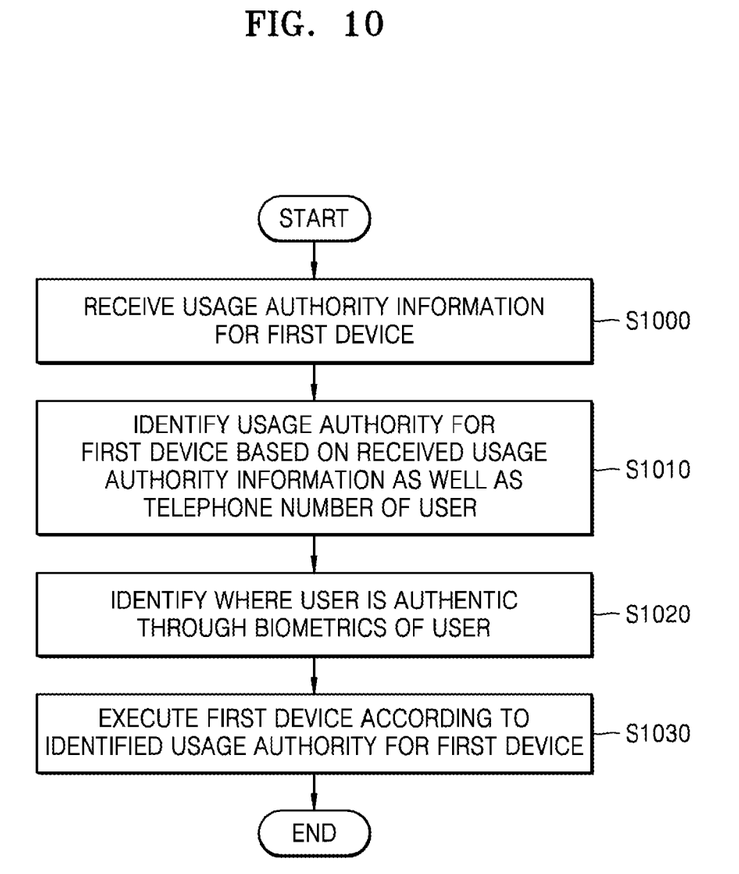
FIG. 10 is a flowchart of a method of executing a device according to usage authority, according to at least another example embodiment.

FIG. 10 is a flowchart of a method of executing a device according to the usage authority according to at least another example embodiment.

Usage authority information for a first device may be received S1000.

The usage authority for the first device may be identified based on the received usage authority information and telephone number information of a user S1010.

Whether the user is authentic may be identified through the biometrics of the user S1020.

The first device may be executed according to the identified usage authority for the first device S1030.

The device described herein may comprise a processor, a memory for storing program data and executing it, a permanent locker unit such as a disk drive, a communication port for handling communications with external devices, and user interface devices including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., ROM, RAM, floppy disks, hard disks, etc.), and optical recording media (e.g., CD-ROMs, digital versatile disks (DVDs), etc.). The computer-readable recording medium can also be distributed over network-coupled computer systems so that the computer-readable code is stored and executed in a distributive manner. This media can be read by the computer, stored in the memory, and executed by the processor.

For the purposes of promoting understanding of the principles of example embodiments of the inventive concepts, reference has been made to example embodiments illustrated in the drawings, and specific language has been used to describe these embodiments. However, no limitation of the scope of example embodiments of the inventive concepts is intended by this specific language, and example embodiments of the inventive concepts should be construed to encompass all embodiments that would normally occur to one of ordinary skill in the art.

The particular implementations shown and described herein are illustrative examples of example embodiments of the inventive concepts and are not intended to otherwise limit the scope of example embodiments of the inventive concepts in any way. For the sake of brevity, conventional electronics, control systems, software development and other functional aspects of the systems may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device.

The use of the terms "a", "an", and the and similar referents in the context of describing example embodiments of the inventive concepts (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. Example embodiments of the inventive concepts are not limited to the described order of the steps. The use of any and all examples, or example-related language (e.g., "such as") provided herein, is intended merely to better illuminate example embodiments of the inventive concepts and does not pose a limitation on the scope of example embodiments of the inventive concepts unless otherwise claimed. Numerous modifications and adaptations will be readily apparent to one of ordinary skill in the art without departing from the spirit and scope of example embodiments of the inventive concepts.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of controlling functions of a first device by a mobile device, the method comprising:
    receiving usage authority information for the first device from a second device by using telephone number information of the mobile device, wherein the usage authority information is mapped to the telephone number information of the mobile device;
    identifying whether or not a user is an authentic user corresponding to the received usage authority information, by using biometric information of the user;
    identifying a usage authority for the first device based on the received usage authority information when the user is identified as the authentic user; and
    executing functions of the first device according to the identified usage authority for the first device,
    wherein the second device stores usage authority information that differs depending on users and includes a usage authority differing depending on the users.

2. The method of claim 1, wherein the biometrics information of the user includes information about fingerprints, an iris, a voice or veins of the user.

3. The method of claim 1, wherein the usage authority information for the first device includes usage authority information permitting execution of the functions of the first device.

4. The method of claim 1, wherein the usage authority information for the first device includes usage authority information permitting execution of the functions of the first device at only a first time from among a plurality of times.

5. The method of claim 1, wherein the usage authority information for the first device includes usage authority information permitting execution of the functions of the first device at only a first space from among a plurality of spaces.

6. The method of claim 1, wherein the first device is an internet of things (IOT) device.

7. A non-transitory computer-readable recording medium having recorded thereon a computer program for performing the method of claim 1.

8. A mobile device for controlling functions of a first device, the mobile device comprising:
    a memory configured to store computer-executable instructions; and
    one or more processors configured to execute the computer-executable instructions to,
    receive usage authority information for the first device from a second device by using telephone number information of the mobile device, wherein the usage authority information is mapped to the telephone number information of the mobile device;
    identify, at the mobile device, whether or not a user is an authentic user corresponding to the received usage authority information, by using biometric information of the user;
    identify a usage authority for the first device based on the received usage authority information when the user is identified as the authentic user; and
    execute functions of the first device according to the identified usage authority for the first device,
    wherein the second device stores usage authority information that differs depending on users and includes a usage authority differing depending on the users.

9. The mobile device of claim 8, wherein the biometrics information of the user includes information about fingerprints, an iris, a voice or veins of the user.

10. The mobile device of claim 8, wherein the usage authority information for the first device includes usage authority information permitting execution of the functions of the first device.

11. The mobile device claim 8, wherein the usage authority information for the first device includes usage authority information permitting execution of the functions of the first device at only a first time from among a plurality of times.

12. The mobile device of claim 8, wherein the usage authority information for the first device includes usage authority information permitting execution of the functions of the first device at only a first space from among a plurality of spaces.

13. The mobile device of claim 8, wherein the first device is an internet of things (IOT) device.

* * * * *